UNITED STATES PATENT OFFICE.

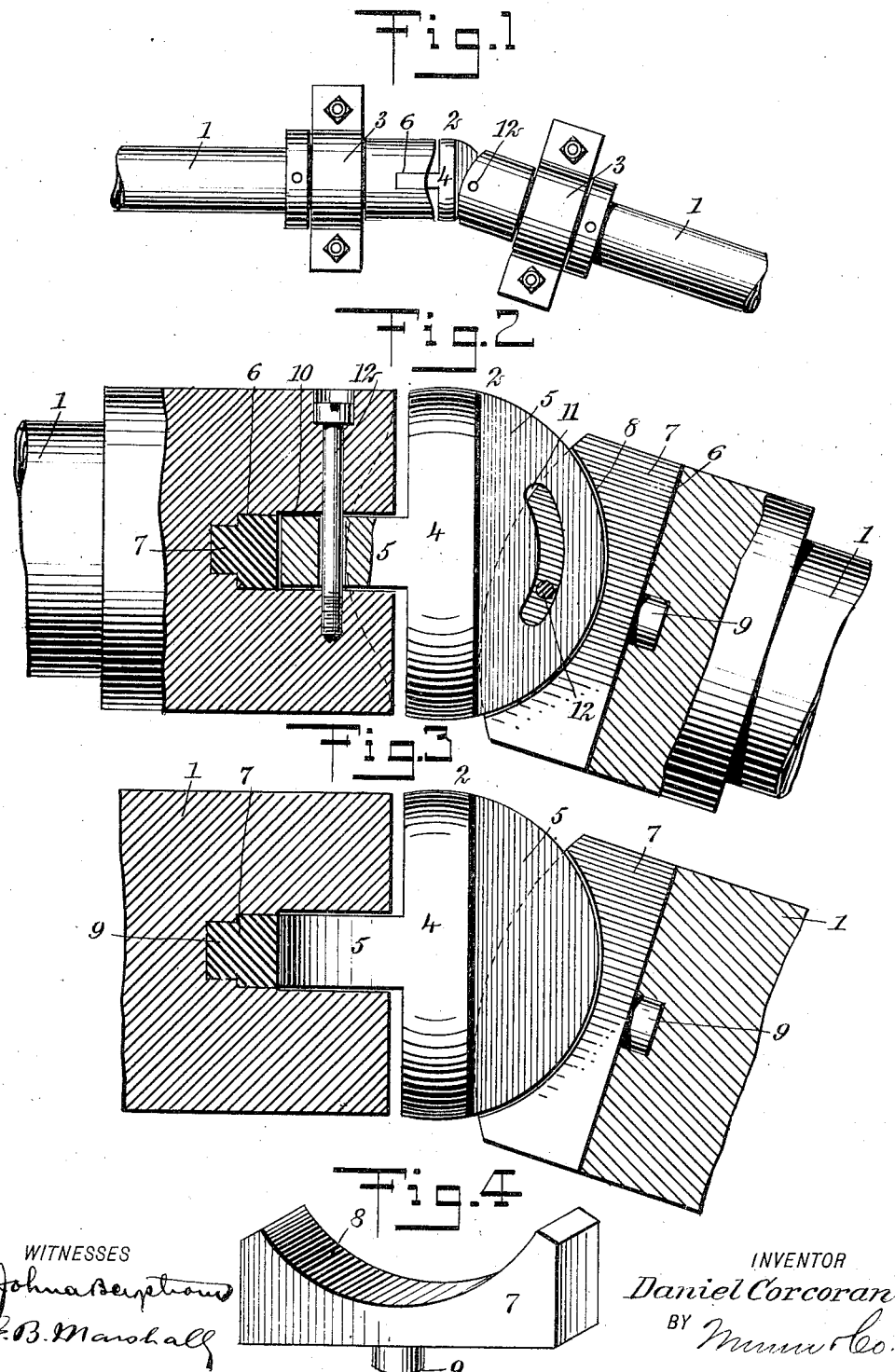

DANIEL CORCORAN, OF YONKERS, NEW YORK.

UNIVERSAL JOINT.

934,140.  Specification of Letters Patent.  Patented Sept. 14, 1909.

Application filed August 14, 1908. Serial No. 448,477.

*To all whom it may concern:*

Be it known that I, DANIEL CORCORAN, a citizen of the United States, and a resident of Yonkers, in the county of Westchester and State of New York, have invented a new and Improved Universal Joint, of which the following is a full, clear and exact description.

My invention relates to universal joints and has for its object to provide one consisting of a disk having a semicurcular flange on each of its sides, the planes of the flanges being substantially at right-angles to the disk and to each other, and two shafts in one of the terminals of each of which there is a semicircular slot, each of the flanges being disposed in one of the slots, there being curved slots in each of the flanges and a pin disposed in each of the shafts through the slots respectively.

Other objects of the invention will appear in the following complete description.

In this specification I will describe the preferred form of my invention but it will be understood that I do not limit myself thereto, as I consider myself entitled to all forms and embodiments of the invention which may be held to fall within the scope of the appended claims.

Reference is to be had to the accompanying drawings, forming a part of this specification, in which similar characters of reference indicate corresponding parts in all the figures, in which—

Figure 1 is a plan view showing my universal joint in use connecting two shafts; Fig. 2 is an enlarged sectional view of my universal joint showing the curved slots in the flanges and the pins disposed therethrough; Fig. 3 is a similar sectional view but without the curved slots and pins; and Fig. 4 is the wear member which I secure in the slots at the terminals of the shafts with which the semicircular flanges may engage.

By referring to the drawings, it will be seen that shafts 1 are coupled together by my universal joint 2, the shafts being journaled in bearings 3. The universal joint 2 consists of a central member or disk 4, to each side of which is secured a semicircular flange 5, the planes of the flanges 5 being substantially at right-angles to the central member or disk 4 and to each other. In the construction of my universal joint, I find it advantageous to make the central member or disk 4 with integral flanges 5, but it will of course, be understood that this is merely a detail of construction, and that if desired, the flanges 5 may be constructed separately and be attached to the central member or disk 4 in any approved manner. Each of the shafts 1 has a slot 6 in its terminal, and in these slots 6 are disposed wear members 7, the wear members having annular surfaces 8 and dowels 9, the dowels 9 being disposed in recesses in the shafts and the concave surfaces 8 extending between the sides 10 of the slots 6. The shafts are then ready to be united by means of the universal joint 2 and when the flanges 5 are disposed in the slots 6 with their peripheries in close proximity to the concave surfaces 8, of the wear members 7, and the shafts are journaled in bearings, it will be found that the shafts are coupled together by means of the universal joint 2 and that they will rotate in unison. When desired annular slots 11 may be made in each of the flanges 5 and pins 12 may be driven through the sides of the slots 6 and through the annular slots 11 in the flanges 5 and by this means the universal joint will be more securely connected between the shafts 1. When the shafts 1 are connected in the manner which has been described, by my universal joint, it will be found that by a very simple construction, great strength is obtained and that the device takes up comparatively little space.

Having thus described my invention, I claim as new and desire to secure by Letters Patent:

1. In a universal joint, two members, there being a concave slot in one of the terminals of each of the members, and a central disk having a flange on each of its two sides, the flanges having their peripheries convex, with their centers substantially at the center of the disk, the flanges being continued until they unite with the central disk near its periphery, the flanges fitting snugly the concave slots respectively, in which they are disposed, the planes of the flanges being disposed at an angle to each other and to the central disk.

2. In a universal joint, two members, there being a concave slot in one of the terminals of each of the members, a central disk having a flange on each of its two sides, the flanges having their peripheries convex, with their centers substantially at the center of the disk, the flanges being continued until they unite with the central disk near its periphery, the flanges fitting snugly the concave slots respectively, in which they are disposed, the planes of the flanges being disposed at an angle to each other and to the central disk, and bearings in which the members are journaled respectively.

3. In a universal joint, two members, there being a slot in the terminal of each of the members, a central member having flanges on each of its two sides, the planes of the flanges being at an angle to each other, the flanges being disposed in the slots respectively, there being annular slots in each of the flanges, and pins in the members which are disposed in the annular slots respectively.

4. In the universal joint, two members, a concave slot in one of the terminals of each of the members, a central member having flanges on each of its two sides, the peripheries of the flanges being convex, the planes of the flanges being substantially at right-angles to the body of the central member and to each other, the flanges being disposed in the concave slots, there being annular slots in each of the flanges, and pins in the members which are disposed in the annular slots respectively.

5. In a universal joint, two members, a concave slot in one of the terminals of each of the members respectively, a central member having a flange on each of its two sides, the peripheries of the flanges being convex, the planes of the flanges being substantially at right-angles to the body of the central member and to each other, the flanges being disposed in the concave slots, there being annular slots in each of the flanges, pins in the members which are disposed in the annular slots respectively, and bearings in which the members are journaled respectively.

In testimony whereof I have signed my name to this specification in the presence of two subscribing witnesses.

DANIEL CORCORAN.

Witnesses:
H. S. TARBELL,
MARY L. SHORT.